United States Patent
Yang

(10) Patent No.: US 11,272,108 B2
(45) Date of Patent: Mar. 8, 2022

(54) THERMAL IMAGE MONITORING APPARATUS AND DISTRIBUTING PANEL HAVING THE SAME

(71) Applicant: LS ELECTRIC CO., LTD., Anyang-si (KR)

(72) Inventor: Seungpil Yang, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 0 days.

(21) Appl. No.: 16/857,709

(22) Filed: Apr. 24, 2020

(65) Prior Publication Data
US 2021/0160428 A1    May 27, 2021

(30) Foreign Application Priority Data
Nov. 25, 2019   (KR) .................... 10-2019-0152576

(51) Int. Cl.
*H04N 5/232* (2006.01)
*H04N 5/225* (2006.01)

(52) U.S. Cl.
CPC ....... *H04N 5/23287* (2013.01); *H04N 5/2253* (2013.01)

(58) Field of Classification Search
USPC ........................................................ 348/162
See application file for complete search history.

(56) References Cited

U.S. PATENT DOCUMENTS

| 9,835,934 B2* | 12/2017 | Matt ...................... F16M 11/12 |
| 2003/0103160 A1* | 6/2003 | Tatewaki ........... G08B 13/1963 348/375 |
| 2004/0017167 A1* | 1/2004 | Nishi ...................... G03F 7/709 318/114 |
| 2014/0168433 A1* | 6/2014 | Frank ....................... H04N 5/33 348/143 |
| 2015/0097950 A1* | 4/2015 | Wang ................. H04N 5/23293 348/144 |
| 2016/0020650 A1* | 1/2016 | Distelzweig ........... H04N 7/183 307/104 |
| 2016/0083110 A1* | 3/2016 | Pan ...................... F16M 11/041 348/144 |
| 2017/0195584 A1* | 7/2017 | Kostrzewa ........... H04N 5/2253 |

(Continued)

FOREIGN PATENT DOCUMENTS

| JP | H04315930 A | 4/1991 |
| JP | H05212664 A | 2/1992 |

(Continued)

OTHER PUBLICATIONS

Korean Office Action for related Korean Application No. 10-2019-0152576; action dated Feb. 22, 2021; (5 pages).

(Continued)

*Primary Examiner* — Behrooz M Senfi

(74) *Attorney, Agent, or Firm* — K&L Gates LLP

(57) ABSTRACT

The present disclosure relates to a thermal image monitoring apparatus and a distributing panel having the same. According to the present disclosure, a rotation-vibration reduction unit and a horizontal vibration reduction unit can prevent relative sliding between a base and a bracket and between the bracket and a thermal image camera, and also reduce vibration in a rotating direction or one direction by virtue of contact with each other.

17 Claims, 10 Drawing Sheets

(56) References Cited

U.S. PATENT DOCUMENTS

2017/0363932 A1* 12/2017 Lim .................. G03B 17/02
2019/0035588 A1*  1/2019 Yang ................. H01H 71/08
2019/0215423 A1*  7/2019 Ortiz ................ H04N 5/2252
2019/0308563 A1* 10/2019 Fujiwara ............ G03B 17/561

FOREIGN PATENT DOCUMENTS

| | | |
|---|---|---|
| JP | 2001103454 A | 10/1999 |
| JP | 2002131830 A | 10/2000 |
| JP | 2002354306 A | 5/2001 |
| JP | 2016038277 A | 3/2016 |
| JP | 2017184306 A | 10/2017 |
| KR | 101260709 B1 | 5/2013 |
| KR | 20180063602 A | 12/2016 |
| KR | 101700183 B1 | 2/2017 |
| KR | 101903342 B1 | 5/2018 |
| KR | 20190036063 | 4/2019 |

OTHER PUBLICATIONS

Korean Notice of Allowance for related Korean Application No. 10-2019-0152576; action dated Aug. 12, 2021; (2 pages).
Japanese Office Action for related Japanese Application No. 2020-076017; action dated Jun. 8, 2021; (6 pages).

\* cited by examiner

THERMAL IMAGE MONITORING APPARATUS AND DISTRIBUTING PANEL HAVING THE SAME

CROSS-REFERENCE TO RELATED APPLICATION

Pursuant to 35 U.S.C. § 119(a), this application claims the benefit of the earlier filing date and the right of priority to Korean Patent Application No. 10-2019-0152576, filed on Nov. 25, 2019, the contents of which is incorporated by reference herein in its entirety.

FIELD OF THE INVENTION

The present disclosure relates to a thermal image monitoring apparatus and a distributing panel having the same. More particular implementation relates to a thermal image monitoring apparatus, capable of reducing deterioration of an installation structure, caused due to vibration generated in a distributing panel, and a distributing panel having the same.

BACKGROUND OF THE INVENTION

A distributing panel is a device that manages electricity of high pressure. For example, the distributing panel may be provided with various power devices such as various switches, relays, lines, bus bars, and the like. The power devices within the distributing panel may generate heat due to overload, and their insulated states may be damaged due to deterioration, which is caused by environmental factors, such as electric/thermal/chemical stress, vibration, and the like. As a result, accidents such as fire and the like may occur.

Therefore, a thermal image monitoring apparatus, such as a thermal image camera, may be used in order to monitor an outbreak of a fire, and the like, in the distributing panel. That is, to recognize a sign of an accident in advance, temperature information related to a target to be monitored (hereinafter, referred to as "thermal image temperature information") may be detected through the thermal image monitoring apparatus, thereby monitoring and detecting a local heat generation in real time.

However, as aforementioned, electric/thermal/chemical stress and vibration may be generated in the distributing panel, and the vibration in the distributing panel may cause the thermal image monitoring apparatus installed in the distributing panel to be deviated from a position at which the apparatus is to be located originally.

That is, the thermal image monitoring apparatus is moved due to the vibration in the distributing panel to thereby illuminating a point different from a point that it is originally desired to shine. Or, a structure installed in the distributing panel is deteriorated and thereby the thermal image monitoring apparatus is separated from its installed point.

PRIOR ART LITERATURE

Patent Literature

Korean Laid-open Publication No. 10-2019-0036063 (Apr. 4, 2019)

SUMMARY OF THE INVENTION

An aspect of the present disclosure is to provide a thermal image monitoring apparatus, capable of solving the aforementioned problems and other drawbacks, and a distributing panel having the same.

Specifically, an aspect of the present disclosure is to provide a thermal image monitoring apparatus, which may include a base fixed to a fixing plate disposed in a distributing panel, a bracket coupled to the base and configured to adjust an angle forming with the base, a thermal image camera coupled to the bracket and configured to adjust a facing direction according to a coupled position thereof to the bracket, and a vibration reduction unit provided at least one of a position where the base and the bracket are coupled to each other and a position where the bracket and the thermal image camera are coupled to each other, and configured to reduce vibration transferred from the fixing plate, and a distributing panel having the same.

To achieve the above aspects and other advantages of the present disclosure, there is provided a thermal image monitoring apparatus, including a base fixed to a fixing plate disposed in a distributing panel, a bracket coupled to the base and configured to adjust an angle forming with the base, and a thermal image camera coupled to the bracket and configured to adjust a facing direction according to a coupled position thereof to the bracket, and a vibration reduction unit provided at least one of a position where the base and the bracket are coupled to each other and a position where the bracket and the thermal image camera are coupled to each other, and configured to reduce vibration transferred from the fixing plate.

The vibration reduction unit may include at least one of a rotation-vibration reduction unit configured to reduce vibration due to rotation of the thermal image camera, and a horizontal vibration reduction unit configured to reduce vibration due to movement of the thermal image camera to right and left.

The base may include a base body formed to be disposed on the fixing plate, and a base protrusion coupling part protruding outward from the base body to be coupled to the bracket. The base body may be provided with a coupling groove formed in a circumferential shape.

The base protrusion coupling part may include a round portion with a coupling hole in which a coupling member is inserted, one surface of the rotation-vibration reduction unit defined on one side surface of the round portion coupled to the bracket, and a rotation guide protruding from the one side surface of the round portion and forming a circumferential curved surface that is convex downward.

The one surface of the rotation-vibration reduction unit may surround the coupling hole.

The one surface of the rotation-vibration reduction unit may have a concave-convex shape that is protruded and recessed repeatedly at a surface of the round portion.

The coupling groove may be provided therein with a stopping jaw on which at least part of the coupling member for coupling between the base and the fixing plate is caught.

The bracket may include a bracket body bent or curved to be convex forward, and a bracket protrusion coupling part protruding from a rear surface of the bracket body to be coupled with the base protrusion coupling part.

The bracket protrusion coupling part may include a round portion coupling part having an opening communicating with the coupling hole when being coupled to the round portion, another surface of the rotation-vibration reduction unit defined on one side surface of the round portion coupling part and brought into contact with the one surface of the rotation-vibration reduction unit to reduce vibration due to rotation of the bracket, and a rotation protrusion protruding to another side of the round portion coupling part and rotating in the vicinity of the rotation guide when the bracket rotates relative to the base centering on one axis.

At least one of the one surface and the another surface of the rotation-vibration reduction unit may have a concave-convex portion that is protruded and recessed repeatedly.

The bracket body may be provided with a plurality of slots disposed with being spaced apart from one another in a lengthwise direction, and the thermal image camera may be fixed to the bracket through at least one thermal image camera coupling member inserted through at least one of the plurality of slots, so that a mounted position of the thermal image camera to the bracket can change.

The bracket body may be provided on a front surface thereof with one surface of a horizontal vibration reduction unit defined between the plurality of slots and brought into contact with one surface of the thermal image camera to reduce vibration due to movement of the thermal image camera.

The one surface of the horizontal vibration reduction unit may have a concave-convex shape that is protruded and recessed repeatedly, and formed in the same direction as the lengthwise direction of the bracket.

The bracket may be provided on both ends thereof with cable holes so that a cable extending from the thermal image camera is inserted.

The thermal image camera may be provided on a rear surface thereof with a concave portion formed concave inwardly to correspond to the bracket body bent to be convex forward.

The concave portion may be formed in the lengthwise direction of the bracket body and provided by two or more in number that are intersect with each other.

The concave portion may be provided with another surface of the horizontal vibration reduction unit brought into contact with the one surface of the horizontal vibration reduction unit to reduce vibration in one direction.

To achieve those aspects and other advantages of the present disclosure, there is provided a distributing panel, including a cabinet having an inner space, a fixing plate installed in the cabinet with being spaced apart from a power component disposed in the space, and a thermal image monitoring apparatus installed on the fixing plate to sense temperature of the power component. The thermal image monitoring apparatus may include a base fixed to the fixing plate, a bracket coupled to the base and configured to adjust an angle forming with the base, a thermal image camera coupled to the bracket and configured to adjust a facing direction according to a coupled position thereof to the bracket, and a vibration reduction unit provided at least one of a position where the base and the bracket are coupled to each other and a position where the bracket and the thermal image camera are coupled to each other, and configured to reduce vibration transferred from the fixing plate.

The vibration reduction unit may include at least one of a rotation-vibration reduction unit configured to reduce vibration due to rotation of the thermal image camera, and a horizontal vibration reduction unit configured to reduce vibration due to movement of the thermal image camera to right and left.

The base may be fixed by being rotated relative to the fixing plate centering on one axis, the bracket may be fixed by being rotated relative to the base centering on another axis perpendicular to the one axis, and the thermal image camera may be fixed by being rotated relative to the bracket centering on an axis orthogonal to the one axis and the another axis.

According to the present disclosure, a base protrusion coupling part and a bracket protrusion coupling part which protrude from a base and a bracket, respectively, can be coupled to each other so as to define a space in which the bracket can easily rotate relative to the base centering on one axis.

A thermal image monitoring apparatus can be fixed after being freely rotated relative to a fixing plate centering on three orthogonal axes. As a degree of freedom of a position where a thermal image camera is installed is increased, the thermal image monitoring apparatus can be easily adjusted in angle to face a power component to monitor.

A rotation-vibration reduction unit and a horizontal vibration reduction unit can prevent relative sliding between a base and a bracket and between the bracket and a thermal image camera, and also reduce vibration in a rotating direction or one direction by virtue of contact with each other.

Rotation protrusions of the bracket can be rotated in the vicinity of a rotation guide so as to be guided by the rotation guide when the bracket is moved up and down due to vibration, thereby reducing such vibration in the up and down direction.

The thermal image camera may be provided with concave portions that intersect with each other. Accordingly, the thermal image camera can be arranged on the bracket in various directions so as to enhance user convenience and to face a position where a power component to monitor is disposed.

DETAILED DESCRIPTION OF THE INVENTION

Hereinafter, a thermal image monitoring apparatus according to an embodiment of the present disclosure will be described in detail with reference to the accompanying drawings.

Figure 1:
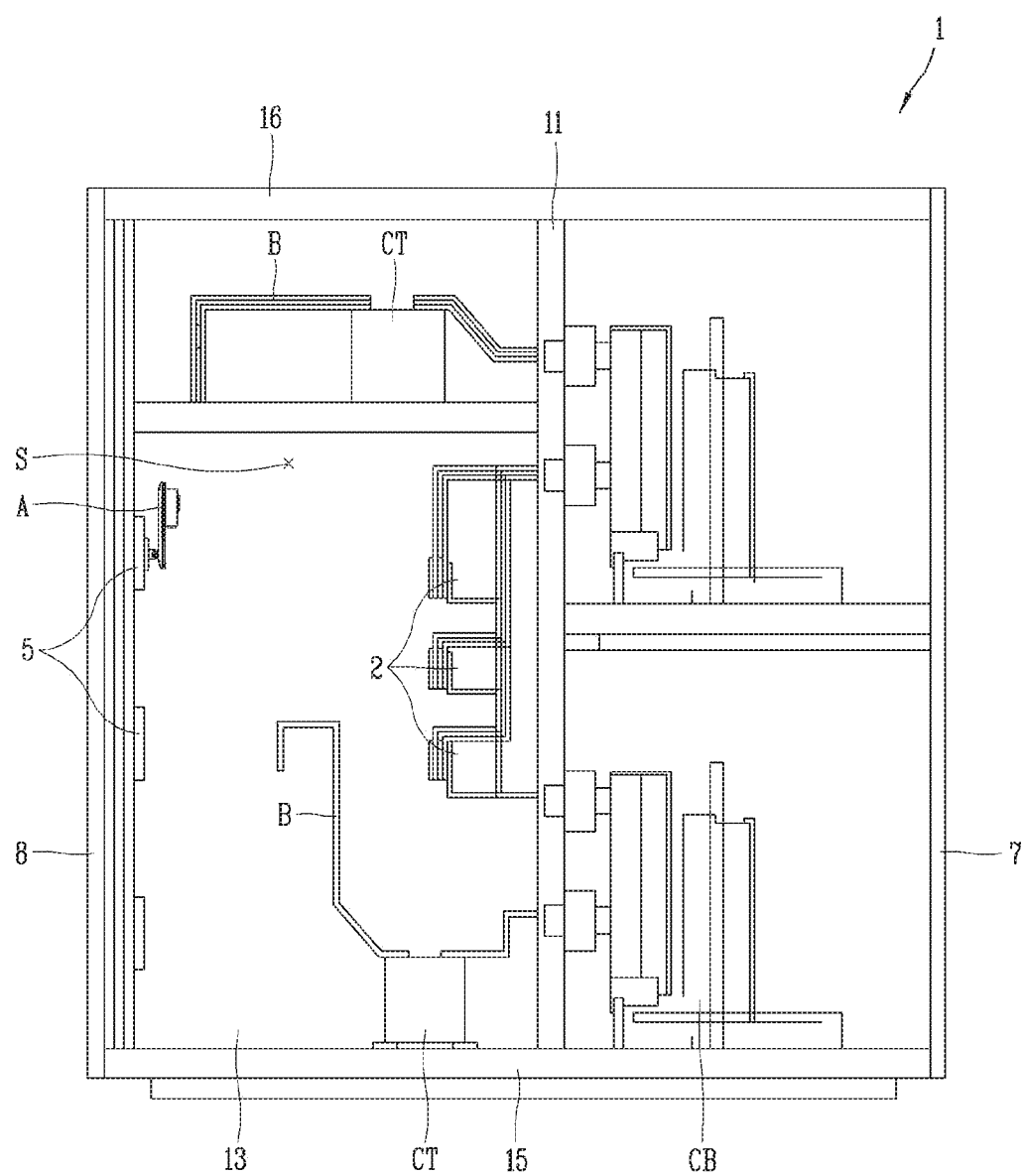
FIG. 1 is a lateral view illustrating an inside of a distributing panel in accordance with one embodiment of the present disclosure.

FIG. 1 is a lateral view illustrating an inside of a distributing panel in accordance with one embodiment of the present disclosure.

A distributing panel according to one embodiment of the present disclosure includes a cabinet 1, a fixing plate 5, and a thermal image monitoring apparatus. Specifically, the distributing panel includes a cabinet 1 defining an inner space S, a power component 2 disposed in the space S, a fixing plate 5, and a thermal image monitoring apparatus installed on the fixing plate 5 to measure temperature of the power component 2.

The cabinet 1 may define appearance of the distributing panel and support power components disposed therein. The cabinet 1 may be configured by an assembly of a plurality of members. The cabinet 1 may include a frame 11 and side covers 13 covering the frame 11. Specifically, the cabinet 1 may include a frame 11, a bottom part 15, side covers 13, and a top cover 16 disposed on a top.

The distributing panel may further include doors 7 and 8 to open and close the space S. The doors 7 and 8 may include a front door 7 to open and close a front opening of the cabinet 1, and a rear door 8 to open and close a rear opening of the cabinet 1. The front door 7 and the rear door 8 may be disposed to be rotatable or slidable.

The fixing plate 5 may be disposed horizontally on an inner side of the rear door 8. That is, the fixing plate 5 may be provided in plurality disposed up and down in a spacing manner in a direction penetrating into the drawing or paper.

The power component 2 which is disposed inside the cabinet 1 and of which temperature is measured by the thermal image monitoring apparatus may be a bus bar B, a capacitor (not illustrated), a reactor (not illustrated), a current transformer (CT), a circuit breaker (CB), or the like.

The power component 2 of which temperature is to be measured by the thermal image monitoring apparatus may be a bus bar B. Objects of which temperatures are to be measured by the thermal image monitoring apparatus may be an R-phase bus bar, a T-phase bus bar, and an S-phase bus bar disposed in a sequential manner.

The power component 2 of which temperature is to be measured by the thermal image monitoring apparatus may be a capacitor. Objects of which temperatures are to be measured by the thermal image monitoring apparatus may be an R-phase capacitor, a T-phase capacitor, and an S-phase capacitor disposed in a sequential manner.

The power component 2 of which temperature is to be measured by the thermal image monitoring apparatus may be a reactor. Objects of which temperatures are to be measured by the thermal image monitoring apparatus may be an R-phase reactor, a T-phase reactor, and an S-phase reactor disposed in a sequential manner.

The power component 2 of which temperature is to be measured by the thermal image monitoring apparatus may be a current transformer (CT). Objects of which temperatures are to be measured by the thermal image monitoring apparatus may be an R-phase current transformer, a T-phase current transformer, and an S-phase current transformer disposed in a sequential manner.

The thermal image monitoring apparatus may measure temperatures of a plurality of power components of the same type, and also measure temperatures of a plurality of power components of different types.

The distributing panel may have the same type of power components with similar temperature ranges, and one thermal image monitoring apparatus may measure temperatures of a plurality of power components which are the same in type and different in position.

Among those various power components inside the distributing panel, there may be a power component which is expected to have high temperature. For example, power may be concentrated on a bus bar part, and it may be expected that the largest amount of heat is generated at the part.

In this case, a user may dispose the thermal image monitoring apparatus toward the bus bar which is expected to generate heat the most.

As aforementioned, the user may install the thermal image monitoring apparatus on a fixing plate 5, which is located at an appropriate height, among the fixing plates 5 spaced up and down from one another, so as to shine on a place to monitor.

Hereinafter, the thermal image monitoring apparatus will be described in detail.

Figure 2:
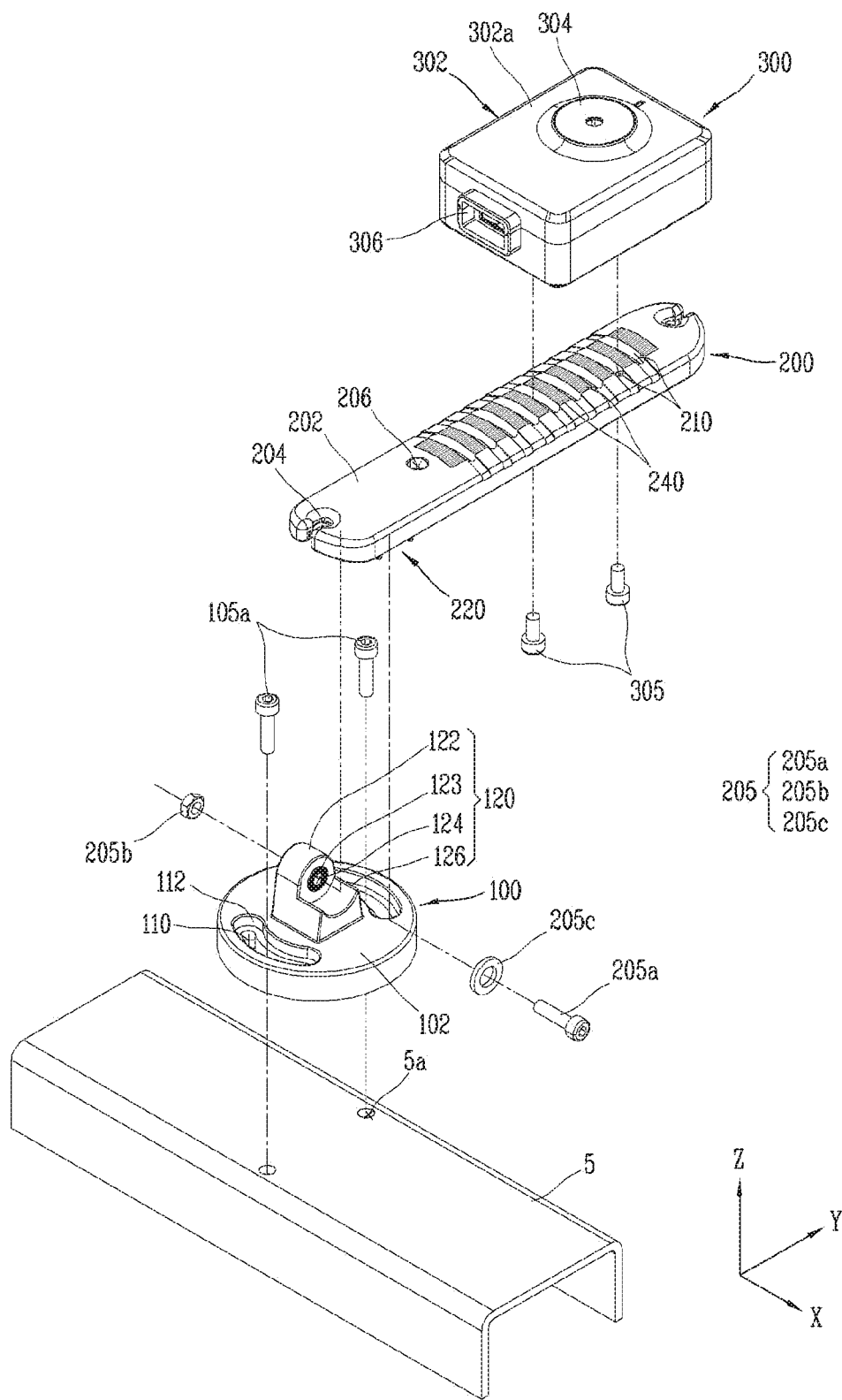
FIG. 2 is an exploded perspective view illustrating a thermal image monitoring apparatus in accordance with one embodiment of the present disclosure.
Figure 3:
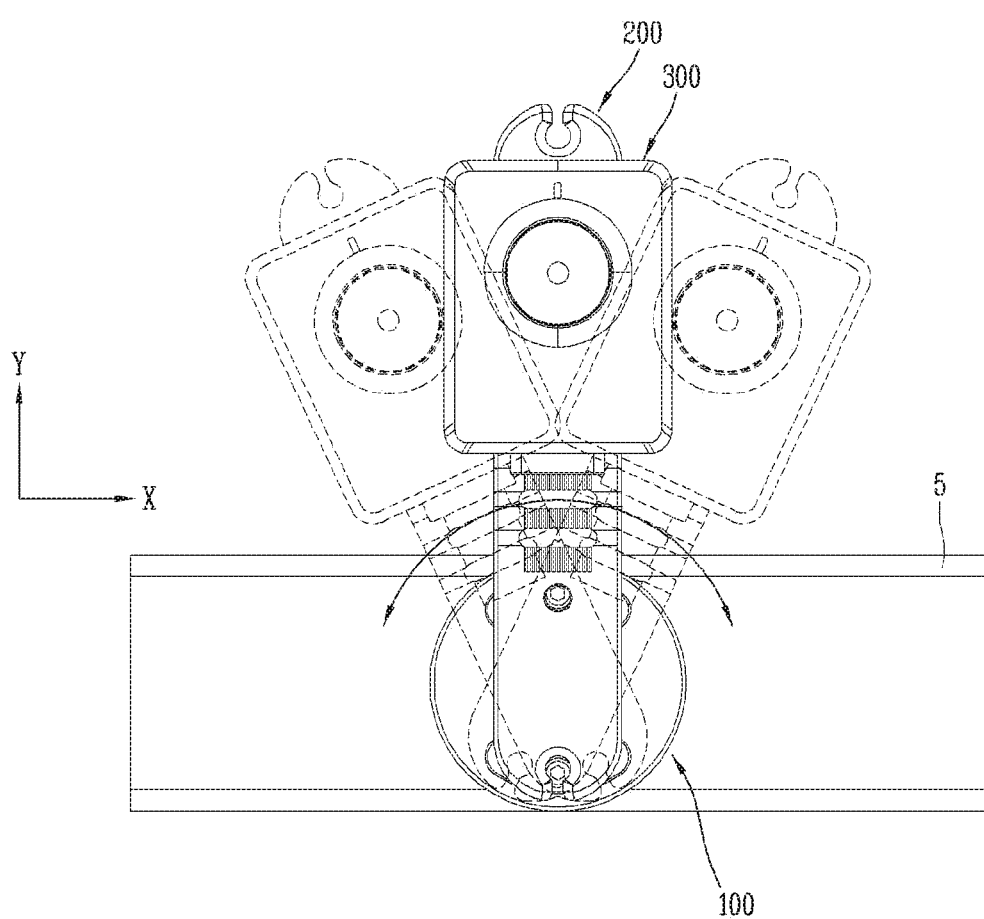
FIGS. 3 to 5 are views illustrating a configuration that the thermal image monitoring apparatus of FIG. 2 is rotatable centering on each axis.
Figure 4:
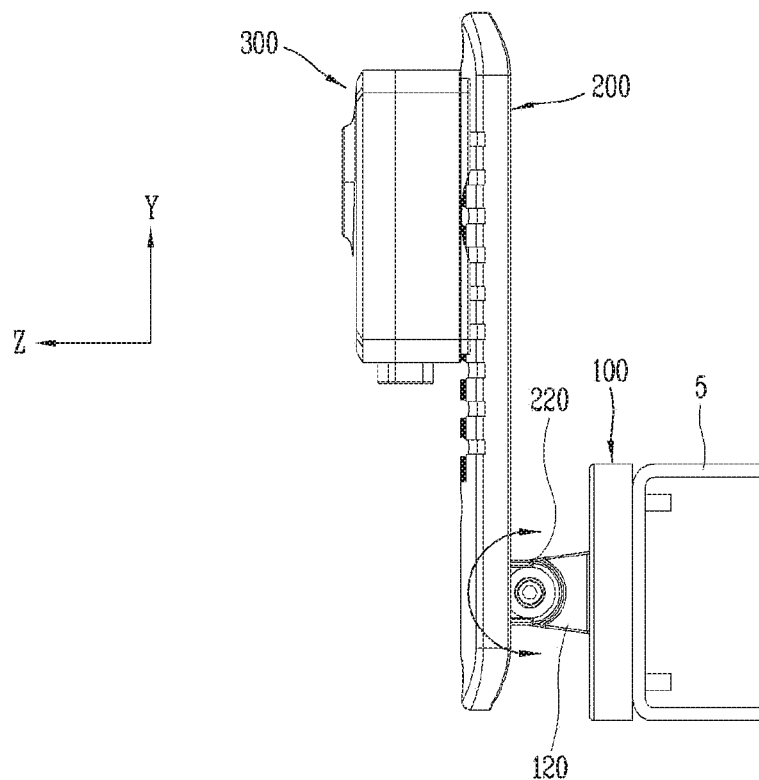
Figure 5:
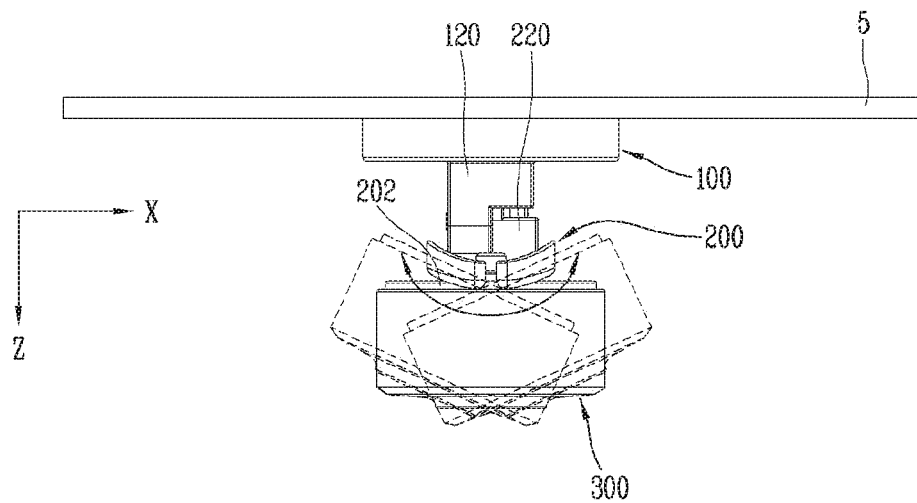

FIG. 2 is an exploded perspective view illustrating a thermal image monitoring apparatus in accordance with one embodiment of the present disclosure, and FIGS. 3 to 5 are views illustrating a configuration that the thermal image monitoring apparatus of FIG. 2 is rotatable centering on each axis.

A thermal image monitoring apparatus according to one embodiment of the present disclosure includes a base 100, a bracket 200, and a thermal image camera 300. A vibration reduction unit is disposed at least one of a position where the base 100 and the bracket 200 are coupled to each other, and a position where the bracket 200 and the thermal image camera 300 are coupled to each other.

The base 100 is fixed to the fixing plate 5 disposed inside the distributing panel, as aforementioned. The fixing plate 5 is provided with a fixing plate hole 5a. The base 100 is fixed to the fixing plate 5 by use of a coupling member 105.

The base 100 may include a base body 102, a base protrusion coupling part 120, and a coupling groove 110.

The base body 102 is formed to be disposed on the fixing plate 5. The base body 102 may be formed in a circular shape to be rotatably coupled to the fixing plate 5 in a Z axis.

The base protrusion coupling part 120 protrudes outward from the base body 102. The base protrusion coupling part 120 protrudes opposite to a surface of the base body 102 facing the fixing plate 5. The base protrusion coupling part 120 is formed to be coupled to the bracket 200.

The base body 102 may be provided with a coupling groove 110 formed to correspond to a circumferential shape. The coupling groove 110 is opened so that the coupling member 105 can be inserted. The coupling member 105 is inserted through the coupling groove 110 to be inserted into the fixing plate hole 5a of the fixing plate 5.

The bracket 200 is coupled to the base 100 and is configured to adjust an angle forming with the base 100. The bracket 200 may include a bracket body 202 that is curved or bent to be convex forward, and a bracket protrusion coupling part 220 protruding from a rear surface of the bracket body 202 to be coupled to the base protrusion coupling part 120.

On the other hand, the bracket body 202 may be provided with a plurality of slots 210 disposed in its lengthwise direction to be spaced apart from one another. The thermal image camera 300 may be fixed to the bracket 200 by coupling members 305 which are inserted through some of the plurality of slots 210.

Cable holes 204 through which a cable extending from the thermal image camera 300 is inserted may be formed at both ends of the bracket 200. A cable for transferring information obtained by the thermal image camera 300 may be inserted into a terminal 306 of the thermal image camera 300. In this instance, the cable may be inserted into one of the cable holes 204 formed at the both ends of the bracket 200, so as to be prevented from being suspended to the inside of the distributing panel.

Also, by forming the cable holes 204 at the both ends of the bracket 200, the cable can be arranged without regard to a direction that the thermal image camera 300 is installed on the bracket 200. In detail, the thermal image camera 300 may be installed on the bracket 200 in different directions, other than a single direction.

That is, unlike the example illustrated in FIG. 2, the thermal image camera 300 may be fixed to the bracket 200 in a horizontally long direction. In this instance, the cable may be inserted into one of the cable holes 204, which is located close to the terminal 306 of the thermal image camera 300.

The bracket body 202 may be provided with a bolt assembly hole 206 formed through the front surface thereof for coupling of the coupling member 105. In detail, the base 102 is formed to be rotatable relative to the fixing plate 5. If the coupling groove 110 of the base 102 is obscured by the bracket body 202, it may make it difficult to assemble the coupling member 105. In this case, the bolt assembly hole 206 may facilitate the coupling member 105 to be inserted into the coupling groove 110.

The bracket body 202 may be provided on its front surface with one surface 240 of a horizontal vibration reduction unit that is located between the plurality of slots 210 and brought into contact with one surface of the thermal image camera 300 to reduce vibration due to movement of the thermal image camera 300. This will be described in detail later.

The thermal image camera 300 may be provided with a body 302, a camera module 304 disposed on a front surface 302a of the body 302, and a terminal 306 formed on a side surface of the body 302 for connection of a cable.

The thermal image camera 300 has a rear surface 302b coupled to the bracket 200 and is configured to adjust its facing direction according to a position at which it is coupled to the bracket 200.

Specifically, the bracket 200 is formed long in up and down directions. The thermal image camera 300 may be disposed between an upper portion and a lower portion of the entire body of the bracket 200 which is long up and down. This may allow an installation height of the thermal image camera 300 to be adjustable.

The front surface of the bracket body 202 may be bent or curved. The rear surface 302b of the thermal image camera 300 may be fixed to the bracket 200 in contact with the bracket body 202 that is bent or curved. In this instance, as the front surface of the bracket body 202 is curved, the thermal image camera 300 may be disposed on the front surface of the bracket body 202 according to a direction that the camera module 304 is to face.

With the structure of the bracket 200, the thermal image camera 300 can be advantageously installed by setting an installation height and a facing direction.

The vibration reduction unit reduces vibration which is transferred from the fixing plate 5 to the thermal image monitoring apparatus. Accordingly, the thermal image monitoring apparatus can be prevented from being separated from the fixing plate 5 or from a position where it shines on a power component to monitor.

The vibration reduction unit may include a rotation-vibration reduction unit that reduces vibration due to rotation of the thermal image camera 300 and/or a horizontal vibration reduction unit that reduces vibration due to movement of the thermal image camera 300 to right and left. This will be described in detail later.

Hereinafter, rotation of each component of the thermal image monitoring apparatus will be described with reference to FIGS. 2 to 5.

The base 100 may be fixed by being rotated relative to the fixing plate 5 centering on one axis. In detail, referring to FIGS. 2 and 3, the base 100 is rotatable relative to the fixing plate 5 centering on a Z axis.

As aforementioned, the fixing plate 5 may be provided with the fixing plate hole 5a. And the coupling groove 110 may be formed long in a circumferential direction of the base 100. Therefore, even when the base 100 is rotated relative to the fixing plate 5 centering on the Z axis, the coupling member 105 can be inserted into the fixing plate hole 5a through the coupling groove 110.

The bracket 200 may be fixed by being rotated relative to the base 100 centering on another axis perpendicular to the one axis. Specifically, referring to FIGS. 2 and 4, the bracket 200 is rotatable with respect to the base 100 centering on the Z axis.

The base protrusion coupling part 120 of the base 100 and the bracket protrusion coupling part 220 of the bracket 200 are coupled to each other. In detail, the base 100 and the bracket 200 are coupled to each other by a coupling member 205. Here, the coupling member 205 may include a bolt 205a, a nut 205b, a washer 205c, and the like.

If the base 100 and the bracket 200 are not coupled to each other in the manner of protruding from the respective bodies 102 and 202, a gap between the bracket 200 and the base 100 becomes narrow, and thereby a radius of rotation of the bracket 200 with respect to the base 100 centering on the X axis may be limited.

In one embodiment of the present disclosure, the base protrusion coupling part 120 and the bracket protrusion coupling part 220 can be coupled by protruding from the base 100 and the bracket 200, respectively, thereby defining a space in which the bracket 200 can be easily rotated with respect to the base 100 centering on the X axis.

The thermal image camera 300 may be fixed by being rotated relative to the bracket 200 centering on an axis that is orthogonal to the one axis and the another axis. Specifically, referring to FIGS. 2 and 5, the thermal image camera 300 is rotatable with respect to the bracket 200, centering on a Y axis that is orthogonal to the X axis and the Z axis.

The bracket body 202 is curved or bent to be convex forward. Accordingly, a direction that the thermal image camera 300 faces differs depending on a portion of the thermal image camera 300 which is brought into contact with the curved front surface of the bracket body 202.

That is, when the thermal image camera 300 is brought into contact with a right portion of the front surface of the bracket body 202, namely, a portion rotated (moved) from the center of the bracket body 202 centering on the X axis, the thermal image camera 300 is disposed to face a portion rotated counterclockwise centering on the Y axis. On the other hand, when the thermal image camera 300 is brought into contact with a left portion of the front surface of the bracket body 202, namely, a portion rotated from the center of the bracket body 202 in a direction of a −X axis, the thermal image camera 300 is disposed to face a portion rotated clockwise center on the Y axis. That is, the direction that the thermal image camera 300 faces may be adjusted according to the curved front surface of the bracket body 202.

As described above, the thermal image monitoring apparatus can be fixed after being freely rotated relative to the fixing plate 5 centering on the three axes orthogonal to one another. As the degree of freedom of the position where the thermal image camera 300 is installed is increased, the thermal image monitoring apparatus can be easily adjusted in angle to face a power component to monitor.

Figure 6:
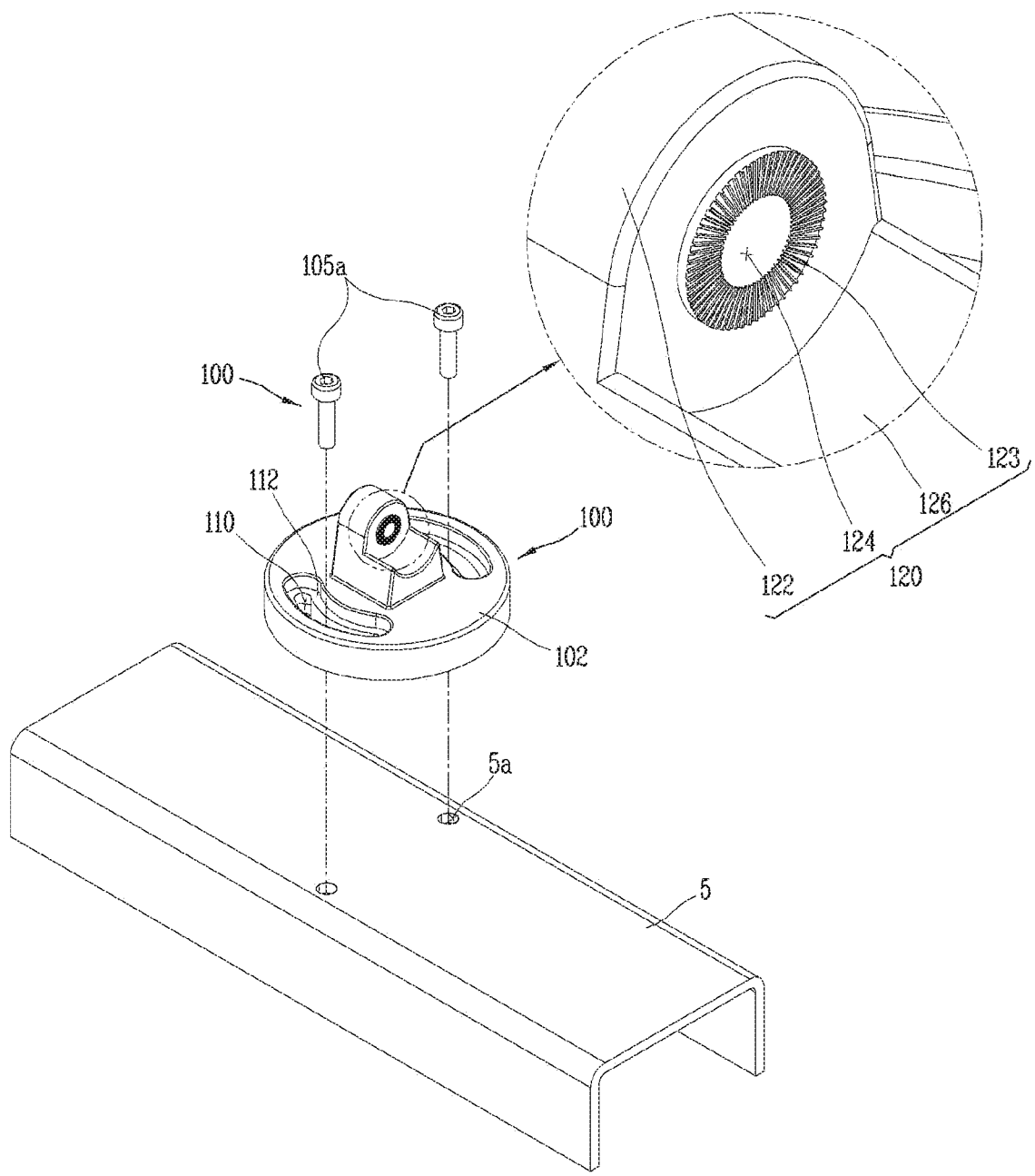
FIG. 6 is a perspective view illustrating that a fixed plate and a base of the thermal image monitoring apparatus of FIG. 2 are coupled to each other.
Figure 7:
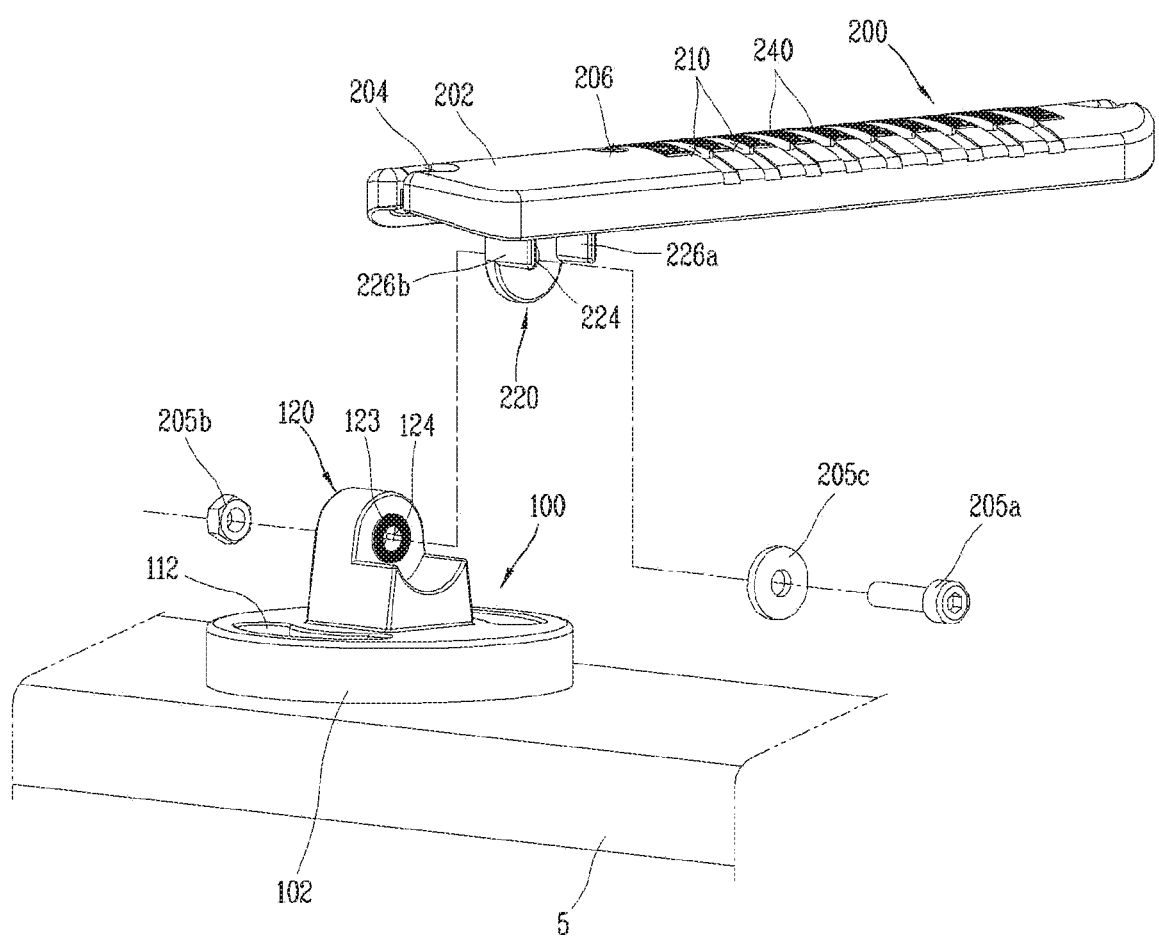
FIG. 7 is a perspective view illustrating that a base and a bracket of the thermal image monitoring apparatus of FIG. 2 are coupled to each other.
Figure 8:
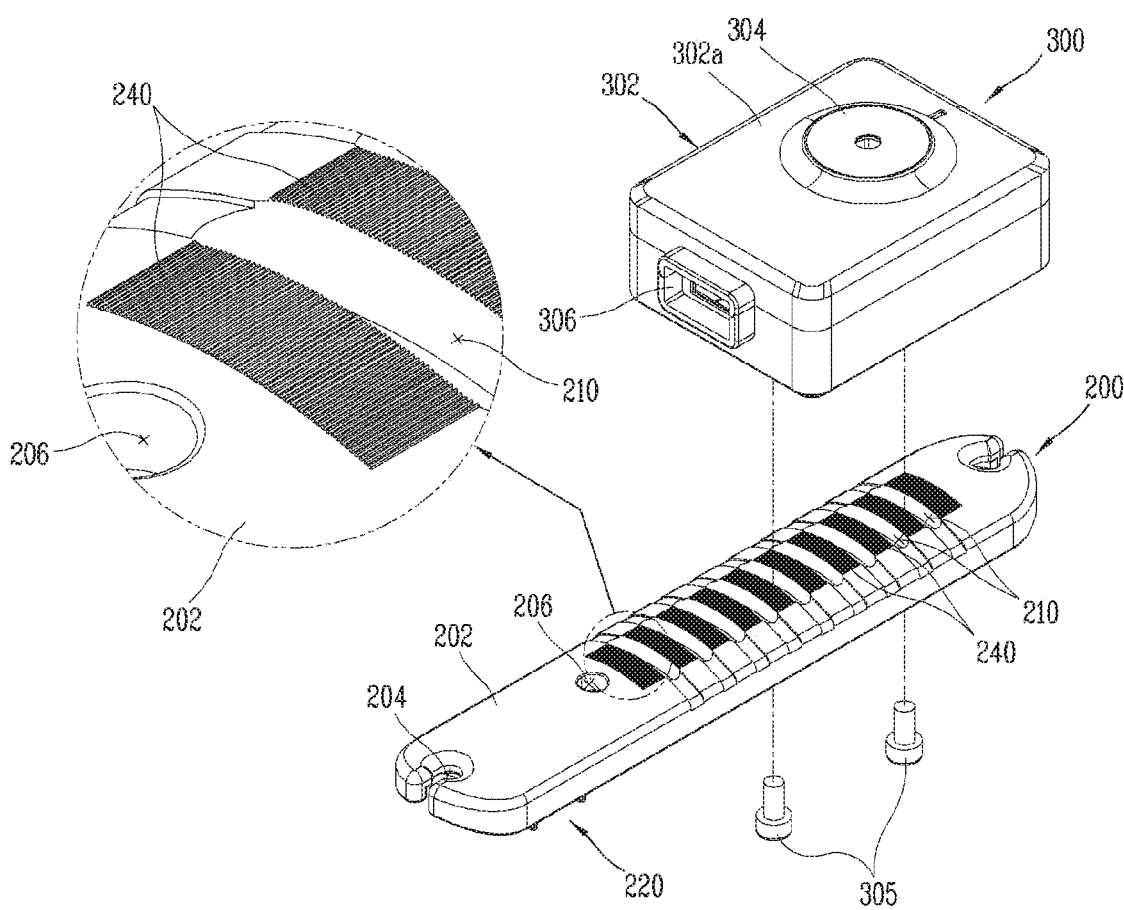
FIGS. 8 and 9 are perspective views illustrating that a bracket and a thermal image camera of the thermal image monitoring apparatus of FIG. 2 are coupled to each other.
Figure 9:
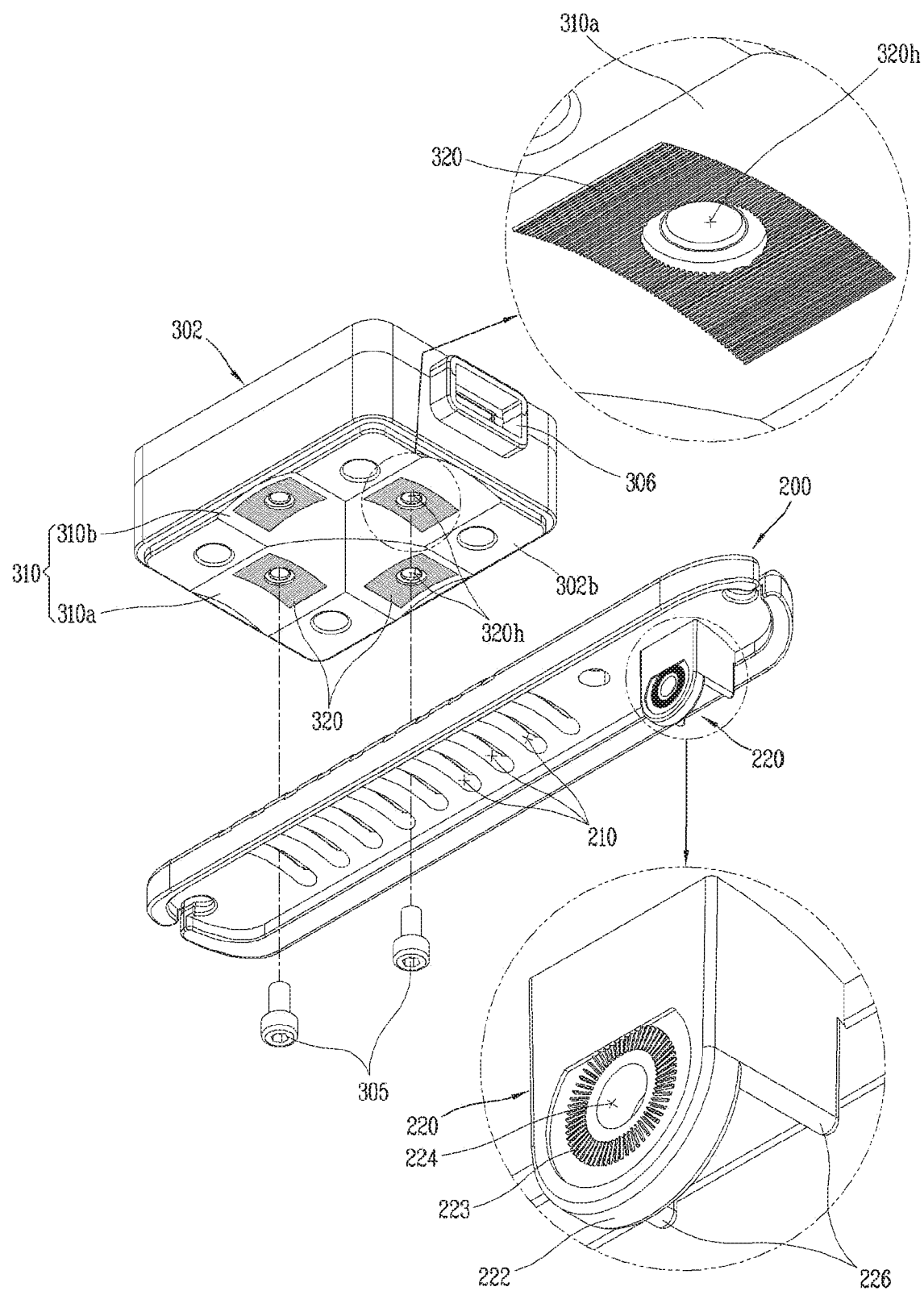
Figure 10A:
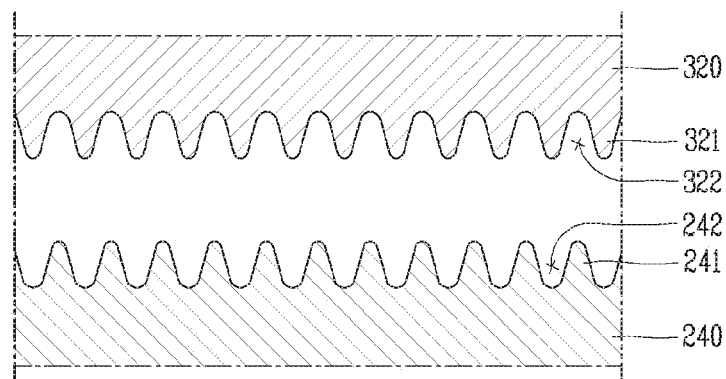
FIGS. 10A to 10C are exemplary views illustrating that a vibration reduction unit reduces vibration in accordance with one embodiment of the present disclosure.
Figure 10B:
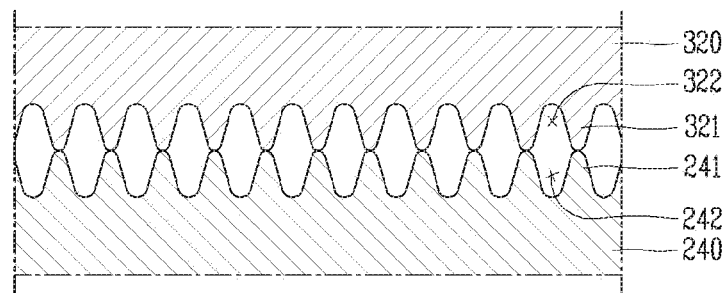
Figure 10C:
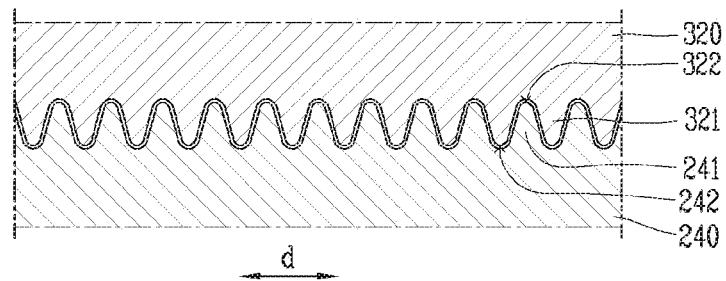

FIG. 6 is a perspective view illustrating that the fixing plate and the base of the thermal image monitoring apparatus of FIG. 2 are coupled to each other. FIG. 7 is a perspective view illustrating that the base and the bracket of the thermal image monitoring apparatus of FIG. 2 are coupled to each other. FIGS. 8 and 9 are perspective views illustrating that the bracket and the thermal image camera of the thermal image monitoring apparatus of FIG. 2 are coupled to each other. FIGS. 10A to 10C are exemplary views illustrating that a vibration reduction unit reduces vibration in accordance with one embodiment of the present disclosure.

Here, FIGS. 8 and 9 are diagrams viewed from different side surfaces for the sake of explanation. In detail, FIG. 8 is a right-top view and FIG. 9 is a left-bottom view.

As aforementioned, the base 100 includes a base protrusion coupling part 120 protruding from the base body 102 to be coupled to the bracket 200. The base protrusion coupling part 102 may include a round portion 122, a one surface 123 of a rotation-vibration reduction unit to be explained later, and a rotation guide 126.

The round portion 122 may have a cross-section that an upper end is rounded and a lower end is gradually widened. A coupling hole 124 through which the coupling member 205 is inserted may be formed through a center of the round portion 122. The coupling member 205 may be inserted through the coupling hole 124 so that the bracket 200 and the base protrusion coupling part 120 can be coupled to each other.

The one surface 123 of the rotation-vibration reduction unit is defined on one side surface of the round portion 122 coupled with the bracket 200. The one surface 123 of the rotation-vibration reduction unit constructs the rotation-vibration reduction unit by being coupled to another surface 223 of the rotation-vibration reduction unit to be explained later. That is, the rotation-vibration reduction unit includes the one surface 123 and the another surface 223.

The one surface 123 of the rotation-vibration reduction unit may be disposed to surround the coupling hole 124. That is, the one surface 123 of the rotation-vibration reduction unit may be formed at the surrounding of the coupling hole 124.

Also, the one surface 123 of the rotation-vibration reduction unit, as illustrated in FIG. 6, may have a concave-convex shape that is protruded or recessed repeatedly on a surface of the round portion 122. With this structure, when the one surface 123 of the rotation-vibration reduction unit is brought into contact with the another surface 223 of the rotation-vibration reduction unit, the another surface 223 of the rotation-vibration reduction unit can be prevented from being slid. Also, the contact between the one surface 123 of the rotation-vibration reduction unit and the another surface 223 of the rotation-vibration reduction unit can result in reducing vibration in a rotating direction.

The rotation guide 126 protrudes from one side surface of the round portion 122 and has a curved surface in a circumferential shape that is convex downward. An upper end of the round portion 122 and the one surface 123 of the rotation-vibration reduction unit may have a cross-section approximately similar to a circle. The rotation guide 126 may protrude in an area corresponding to a lower end portion of a circumference of the circle.

The rotation guide 126 defines a circumferential curved surface that is convex downward. Rotation protrusions 226 (see FIG. 9) of the bracket 200 are disposed adjacent to the surface of the rotation guide 126. When the bracket 200 is rotated relative to the base 100, the rotation protrusions 226 of the bracket 200 may be rotated on the rotation guide 126 in such a slightly touching manner.

Since the rotation protrusions 226 of the bracket 200 are rotated with slightly contacting the rotation guide 126, the rotation protrusions 226 can be supported by the rotation guide 126 when the bracket 200 is moved up and down due to vibration, thereby reducing such up-and-down vibration.

The coupling groove 110 of the base 100 may be provided by two that face each other. In detail, the coupling groove 110 may be provided by two to correspond to the number of fixing plate holes 5a formed in the up-and-down direction of the fixing plate 5. The coupling grooves 110 are preferably formed in a circumferential shape such that the coupling members 104 can be inserted into the fixing plate holes 5a even though the base 100 is rotated.

That is, the two coupling grooves 110 facing each other are formed in the circumferential shape so that the coupling members 105 can be inserted into the fixing plate holes 5a even though the base is rotated.

A stopping jaw 112 on which at least part of the coupling member 105 for coupling the base 100 and the fixing plate 5 may be formed inside each of the coupling grooves 110. In detail, referring to FIG. 2, the coupling member 105 may be a bolt, and a bolt head 105a formed on an upper end of the bolt 105 may be caught on the stopping jaw 112.

Hereinafter, the bracket 200 will be described with reference to FIGS. 8 and 9.

The bracket 200 may include a bracket body 202 bent to be convex forward. Specifically, the bracket body 202 may be bent or curved to be convex to an opposite side of the base 100.

The bracket body 202 which is convex forward is brought into contact with a concave portion 310 formed on the rear surface 302b of the thermal image camera 300, to stably support the thermal image camera 300. In addition, the bracket body 202 is bent to be convex, like a part of a circumference, so as to adjust the direction that the thermal image camera 300 faces according to the position where the thermal image camera 300 is disposed, as aforementioned.

The bracket protrusion coupling part 220 protrudes from the rear surface of the bracket body 202 to be coupled to the base protrusion coupling part 120. The bracket protrusion coupling part 220 may include a round portion coupling part 222, another surface 223 of the rotation-vibration reduction unit, and rotating protrusions 226.

The round portion coupling part 222 is provided with an opening 224 that communicates with the coupling hole 124 upon coupling with the round portion 122 of the base 100. The round portion 122 and the round portion coupling part 221 may be coupled after being rotated relative to each other. Accordingly, the round portion coupling part 221 is preferably formed in a shape similar to the circle at the circular lower end of the round portion 122 of the base 100.

The another surface 223 of the rotation-vibration reduction unit 223 is located on one side surface of the round portion coupling part 222. In detail, the another surface of the rotation-vibration reduction unit 223 is formed on a surface of the round portion coupling part 222, which faces the one surface 123 of the rotation-vibration reduction unit when the round portion coupling part 222 is coupled to the round portion 122 of the base 100.

The another surface 223 of the rotation-vibration reduction unit may be brought into contact with the one surface 123 of the rotation-vibration reduction unit of the base 100 so as to reduce vibration due to the rotation of the bracket 200. In detail, at least one of the one surface 123 and the another surface 223 of the rotation-vibration reduction unit may be provided with a concave-convex pattern that is repeatedly protruded and recessed.

For example, one of the one surface 123 and the another surface 223 of the rotation-vibration reduction unit may be made of an elastic material and the other may have the concave-convex shape. Accordingly, when the surface formed of the elastic material is coupled to the portion (the surface) with the concave-convex shape through the coupling member 205, the surface formed of the elastic material may be deformed due to a convex (protruded) portion of the surface in the concave-convex shape.

Accordingly, the one surface 123 and the another surface of the rotation-vibration reduction unit can be strongly coupled to each other, which may result in reducing deformation and shaking due to vibration. Also, the rotation-vibration reduction unit can reduce relative rotation between the base protrusion coupling part 120 and the bracket protrusion coupling part 220. This may result in preventing the change of an initially-set angle between the base 100 and the bracket 200 which is caused due to vibration.

Alternatively, both of the one surface 123 and the another surface 223 of the rotation-vibration unit may have concave-convex portions, respectively.

The rotation protrusions 226 protrude to another side of the round portion coupling part 222. The rotation protrusions 226 may protrude opposite to a surface of the round portion coupling part 222 where the another surface 223 of the rotation-vibration reduction unit is defined. The rotation protrusions 226 may be located at a position corresponding to the rotation guide 126 of the base 100. The rotation protrusions 226 can rotate in the vicinity of the rotation guide 126 when the bracket 200 rotates relative to the base 100 centering on one axis.

The rotation protrusions 226 may be disposed at both sides to face each other. Therefore, when the bracket 200 rotates relative to the base 100, one of the rotation protrusions 226 may be disposed close to the rotation guide 126.

For example, when the bracket 200 rotates relative to the base 100 to face upward, a first rotation protrusion 226a rotates to be at an inner side of the rotation guide 126, and a second rotation protrusion 226b rotates to be at an outer side of the rotation guide 126.

That is, as the bracket 200 rotates, one of the rotation guides 226 disposed at both sides to face each other may be brought into contact with the rotation guide 126, thereby guiding the rotation of the bracket. In addition, when the bracket 200 is shaken due to vibration, the rotation protrusions 226 can support the rotation guide 126, thereby reducing the vibration.

Hereinafter, the bracket 200 and the thermal image camera 300 will be described with reference to FIGS. 8 and 9.

One surface 240 of a horizontal vibration reduction unit may be defined on a front surface of the bracket body 202. The one surface 240 of the horizontal vibration reduction unit is defined between the plurality of slots 210. The one surface 240 of the horizontal vibration reduction unit may be brought into contact with one surface of the thermal image camera 300 to reduce vibration due to movement of the thermal image camera 300.

The one surface of the horizontal vibration reduction unit may have a concave-convex shape that is protruded and recessed repeatedly, and may be formed in the same direction as a lengthwise direction of the bracket 200. In detail, as illustrated in FIG. 8, the one surface 240 of the horizontal vibration reduction unit may have the concave-convex shape in the same direction as the lengthwise direction of the bracket 200.

The thermal image camera 300 may be fixed to the bracket 200 through at least one thermal image camera coupling member 305, which is inserted through at least one of the plurality of slots 210, so that its mounted position to the bracket 200 can change.

Specifically, as illustrated in FIGS. 8 and 9, the at least one coupling member 305 which is inserted through the at least one of the plurality of slots 210 is coupled to at least one coupling hole 320h that is formed on a rear surface of the thermal image camera body 302. Accordingly, the bracket 200 and the thermal image camera 300 can be fixed to each other.

The rear surface of the thermal image camera 300 may include concave portions 310 that are recessed inward to correspond to the bracket body 202 that is curved to be convex forward.

The concave portion 310 may be recessed to correspond to the front surface of the bracket body 202. That is, a degree that the concave portion 310 is concave or recessed corresponds to a degree that the front surface of the bracket body 202 is curved or bent. Accordingly, the rear surface of the thermal image camera 300 and the front surface of the bracket 200 can overlap each other and each concave portion 310 can be entirely brought into contact with the bracket body 202.

The concave portion 310 may be formed in the lengthwise direction of the bracket body 202 and provided by two or more so as to intersect with each other. As illustrated in FIG. 9, a first concave portion 310a may be formed long in a vertical direction of the thermal image camera 300 and a second concave portion 310b may perpendicularly intersect with the first concave portion 310a.

Accordingly, in order to enhance user convenience and make the thermal image camera 300 face a place where a power component to monitor is disposed, the first concave portion 310a may be disposed vertically to be in contact with the bracket body 202, and the second concave portion 310b may be disposed horizontally to be in contact with the bracket body 202.

Each concave portion 310 may be provided with another surface 320 of the horizontal vibration reduction unit that is brought into contact with the one surface 240 of the horizontal vibration reduction unit of the bracket 200 so as to reduce vibration in one direction. In detail, as illustrated in FIGS. 8 and 9, the one surface 240 of the horizontal vibration reduction unit defined on the front surface of the bracket body 202 can be coupled with the another surface 320 of the horizontal vibration reduction unit formed around the coupling hole 320a of the concave portion 310 formed on the rear surface of the thermal image camera body 302.

Pressing force between the bracket 200 and the thermal image camera 300 may concentrate on the surrounding of the coupling hole 320a by the coupling member 305. Since the another surface 320 of the horizontal vibration reduction unit is formed on the surrounding of the coupling hole 320a on which the pressing force concentrates, the effect of reducing vibration in a horizontal direction can increase.

Referring to FIG. 10A, the one surface 240 and the another surface 320 of the horizontal vibration reduction unit are spaced apart from each other. Each of the one surface 240 and the another surface 320 of the horizontal vibration reduction unit may have the concave-convex shape. In detail, the one surface 240 of the horizontal vibration reduction unit may have protruding portions 241 and recess portions 242 that are repeatedly formed. The another surface 320 of the horizontal vibration reduction unit may also have protruding portions 321 and recess portions 322 that are repeatedly formed.

Referring to FIG. 10B, while the thermal image camera 300 and the bracket body 202 are coupled to each other, the one surface 240 and the another surface 320 of the horizontal vibration reduction unit are disposed close to each other. At this time, the protruding portions 241 of the one surface 240 of the horizontal vibration reduction unit may overlap the protruding portions 321 of the another surface of the horizontal vibration reduction unit. This is a state in which the thermal image camera 300 and the bracket body 202 are not completely coupled to each other yet.

Referring to FIG. 10C, the one surface 240 and the another surface of the horizontal vibration reduction unit are completely coupled to each other so that the concave-convex shapes are engaged with each other.

Prior to being coupled by the coupling member 305, the one surface 240 and the another surface 320 of the horizontal vibration reduction unit may be in contact with each other in the state as illustrated in FIG. 10B.

In this instance, when the bracket 200 and the thermal image camera 300 are coupled to each other by use of the coupling member 305, one of the one surface 240 and the another surface of the horizontal vibration reduction unit may be moved to be in the state as illustrated in FIG. 10C.

In this instance, the movement of the thermal image camera 300 to right and left (e.g., in a direction d in FIG. 10C) is limited. In addition, vibration that is transferred from the bracket 200 to the thermal image camera 300 can be reduced. This may also result in reducing unintended movement of the thermal image camera 300 which may be caused as the coupling between the bracket 200 and the thermal image camera 300 is loosed due to vibration of a distributing panel.

On the other hand, the coupling between the concave-convex portions may equally be made between the one surface 123 and the another surface 223 of the rotation-vibration reduction unit. Also, one surface of each of the rotation-vibration reduction unit and the horizontal vibration reduction unit may be elastically flat and another surface may have a concave-convex shape.

Unlike the foregoing description, the protruding portions 241 and 321 of the one surface 240 and the another surface 320 of the horizontal vibration reduction unit may have lengths shorter than those of the recess portions 242 and 322. In this instance, a space or gap may be formed in each recess portion 242 and 322 when the front surface of the bracket body 202 and the concave portions 310 of the thermal image camera 300 overlap each other. Therefore, the coupling member 305 can couple the bracket body 202 and the thermal image camera 300 while causing a slight elastic deformation due to the space formed in each recess portion 242 and 322.

On the other hand, unlike the aforementioned, the another surface 320 of the horizontal vibration reduction unit may also be formed on another portion of the concave portion 310 in addition to the surrounding of the coupling hole 320h of the concave portion 310. For example, the another surface 320 of the horizontal vibration reduction unit may be formed in an area except for an area where the first concave portion 310a and the second concave portion 310b overlap each other. In this instance, the one surface 240 and the another surface 320 of the horizontal vibration reduction unit can be brought into contact with each other at a larger area, thereby further increasing the coupling force between the bracket 200 and the thermal image camera 300.

Figure 11:
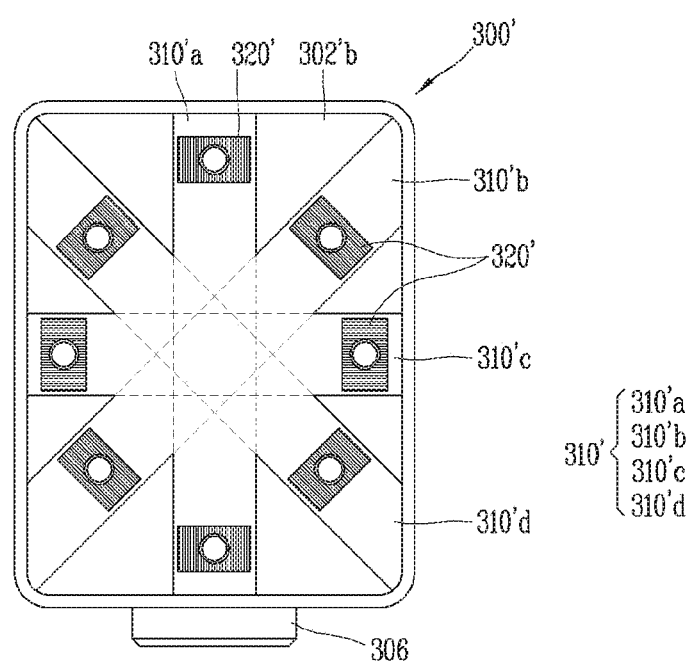
FIG. 11 is a rear view illustrating that a vibration reduction unit reduces vibration in accordance with another embodiment of the present disclosure.

FIG. 11 is a rear view illustrating a thermal image camera in accordance with another embodiment of the present disclosure. A thermal image camera 300' illustrated in FIG. 11 have the same or similar components to those of the thermal image camera 300 illustrated in FIG. 9 except for a shape of a concave portion 310'. Therefore, description of those similar components will be omitted.

Referring to FIG. 11, concave portions 310' of the thermal image camera 300' may be formed at four places. In detail, a first concave portion 310a', a second concave portion 310b', a third concave portion 310c', and a fourth concave portion 310d' may intersect with one another at about 45 degrees. Another surface 320' of a horizontal vibration reduction unit is disposed on each concave portion 310'.

In this instance, the number of directions that the thermal image camera 300' can be arranged when mounted to the bracket can increase. This may allow a user to arrange the thermal image camera 300' to shine on a power component to monitor within a distributing panel more accurately.

It should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A thermal image monitoring apparatus, comprising
a base fixed to a fixing plate disposed in a distributing panel;
a bracket coupled to the base and configured to adjust an angle forming with the base;
a thermal image camera coupled to the bracket and configured to adjust a facing direction according to a coupled position thereof to the bracket; and
a vibration reduction unit provided in at least one position where the base and the bracket are coupled to each other and a position where the bracket and the thermal image camera are coupled to each other, and configured to reduce vibration transferred from the fixing plate,
wherein the vibration reduction unit comprises at least one of a rotation-vibration reduction unit configured to reduce vibration due to rotation of the thermal image camera or a horizontal vibration reduction unit configured to reduce vibration due to movement of the thermal image camera to right and left,
wherein the base comprises a base body formed to be disposed on the fixing plate and a base protrusion coupling part protruding outward from the base body to be coupled to the bracket,
wherein the base protrusion coupling part comprises a round portion with a coupling hole in which a coupling member is inserted and one surface of the rotation-vibration reduction unit defined on one side surface of the round portion coupled to the bracket,
wherein the bracket comprises a bracket body bent or curved to be convex forward and a bracket protrusion coupling part protruding from a rear surface of the bracket body to be coupled with the base protrusion coupling part,
wherein the bracket protrusion coupling part comprises a round portion coupling part having an opening communicating with the coupling hole when being coupled to the round portion and another surface of the rotation-vibration reduction unit defined on one side surface of the round portion coupling part and brought into contact with the one surface of the rotation-vibration reduction unit to reduce vibration due to rotation of the bracket, wherein the one and another surface of the rotation-vibration reduction unit have a concave-convex shape, and wherein the concave-convex shape is formed radially.

2. The apparatus of claim 1, wherein the base body is provided with a coupling groove formed in a circumferential shape.

3. The apparatus of claim 2, wherein the base protrusion coupling part comprises:

a rotation guide protruding from the one side surface of the round portion and forming a circumferential curved surface that is convex downward.

4. The apparatus of claim 3, wherein the one surface of the rotation-vibration reduction unit surrounds the coupling hole.

5. The apparatus of claim 4, wherein the one surface of the rotation-vibration reduction unit has a concave-convex shape that is protruded and recessed repeatedly at a surface of the round portion.

6. The apparatus of claim 2, wherein the coupling groove is provided therein with a stopping jaw on which at least part of the coupling member for coupling between the base and the fixing plate is caught.

7. The apparatus of claim 3, wherein the bracket protrusion coupling part comprises:

a rotation protrusion protruding to another side of the round portion coupling part and rotating in the vicinity of the rotation guide when the bracket rotates relative to the base centering on one axis.

8. The apparatus of claim 1, wherein at least one of the one surface and the another surface of the rotation-vibration reduction unit has a concave-convex portion that is protruded and recessed repeatedly.

9. The apparatus of claim 3, wherein the bracket body is provided with a plurality of slots disposed with being spaced apart from one another in a lengthwise direction, and wherein the thermal image camera is fixed to the bracket through at least one thermal image camera coupling member inserted through at least one of the plurality of slots, so that a mounted position of the thermal image camera to the bracket can change.

10. The apparatus of claim 9, wherein the bracket body is provided on a front surface thereof with one surface of a horizontal vibration reduction unit defined between the plurality of slots and brought into contact with one surface of the thermal image camera to reduce vibration due to movement of the thermal image camera.

11. The apparatus of claim 10, wherein the one surface of the horizontal vibration reduction unit has a concave-convex shape that is protruded and recessed repeatedly, and formed in the same direction as the lengthwise direction of the bracket.

12. The apparatus of claim 9, wherein the bracket is provided on both ends thereof with cable holes so that a cable extending from the thermal image camera is inserted.

13. The apparatus of claim 10, wherein the thermal image camera is provided on a rear surface thereof with a concave portion formed concave inwardly to correspond to the bracket body bent to be convex forward.

14. The apparatus of claim 13, wherein the concave portion is formed in the lengthwise direction of the bracket body and provided by two or more in number that are intersect with each other.

15. The apparatus of claim 13, wherein the concave portion is provided with another surface of the horizontal vibration reduction unit brought into contact with the one surface of the horizontal vibration reduction unit to reduce vibration in one direction.

16. A distributing panel, comprising:

a cabinet having an inner space;

a fixing plate installed in the cabinet being spaced apart from a power component disposed in the inner space; and a thermal image monitoring apparatus installed on the fixing plate to sense temperature of the power component, wherein the thermal image monitoring apparatus comprises:

a base fixed to the fixing plate;

a bracket coupled to the base and configured to adjust an angle formed with the base;

a thermal image camera coupled to the bracket and configured to adjust a facing direction according to a coupled position thereof to the bracket; and a vibration reduction unit provided in at least one position where the base and the bracket are coupled to each other and a position where the bracket and the thermal image camera are coupled to each other, and configured to reduce vibration transferred from the fixing plate, wherein the vibration reduction unit comprises at least one of a rotation-vibration reduction unit configured to reduce vibration due to rotation of the thermal image camera or a horizontal vibration reduction unit configured to reduce vibration due to movement of the thermal image camera to right and left, wherein the base comprises a base body formed to be disposed on the fixing plate and a base protrusion coupling part protruding outward from the base body to be coupled to the bracket, wherein the base protrusion coupling part comprises a round portion with a coupling hole in which a coupling member is inserted and one surface of the rotation-vibration reduction unit defined on one side surface of the round portion coupled to the bracket, wherein the bracket comprises a bracket body bent or curved to be convex forward and a bracket protrusion coupling part protruding from a rear surface of the bracket body to be coupled with the base protrusion coupling part, wherein the bracket protrusion coupling part comprises a round portion coupling part having an opening communicating with the coupling hole when being coupled to the round portion and another surface of the rotation-vibration reduction unit defined on one side surface of the round portion coupling part and brought into contact with the one surface of the rotation-vibration reduction unit to reduce vibration due to rotation of the bracket, wherein the one and another surface of the rotation-vibration reduction unit have a concave-convex shape, and wherein the concave-convex shape is formed radially.

17. The distributing panel of claim 16, wherein the base is fixed by being rotated relative to the fixing plate centering on one axis, wherein the bracket is fixed by being rotated relative to the base centering on another axis perpendicular to the one axis, and wherein the thermal image camera is fixed by being rotated relative to the bracket centering on an axis orthogonal to the one axis and the another axis.

\* \* \* \* \*